April 18, 1950     A. W. ANISH     2,504,615
PHOTOGRAPHIC EMULSIONS CONTAINING N-ARYLOXY-,
ARYLTHIO-, AND ARYLSELENOALKYL CYANINE DYES
Filed Dec. 29, 1945
Fig.1
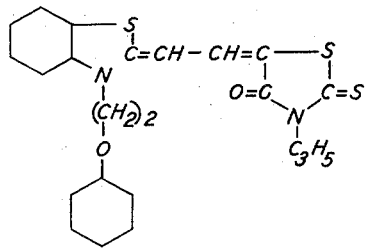
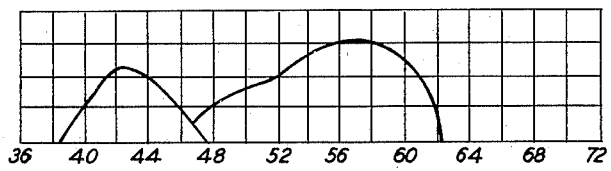
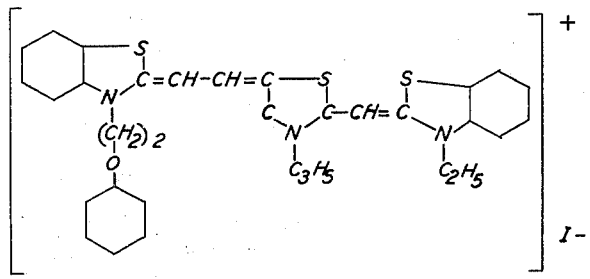
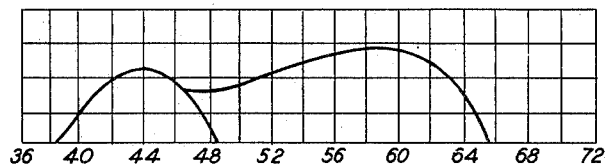
Fig.2
INVENTOR
ALFRED W. ANISH
BY
ATTORNEYS

UNITED STATES PATENT OFFICE 2,504,615

PHOTOGRAPHIC EMULSIONS CONTAINING N-ARYLOXY-, ARYLTHIO-, AND ARYL-SELENOALKYL CYANINE DYES

Alfred W. Anish, Vestal, N. Y., assignor to General Aniline & Film Corporation, New York, N. Y., a corporation of Delaware Application December 29, 1945, Serial No. 638,496

4 Claims. (Cl. 95—7)

The present invention relates to the production of new dyes and more particularly to new dyes of the merocyanine and rhodacyanine type.

The new merocyanine and rhodacyanine dyes of the present invention are characterized by containing in the dye molecule the following heterocyclic nucleus:

I.
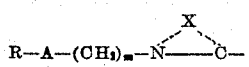

C in the nucleus being in α- or γ-position with respect to the nitrogen atom.

More specifically, the new merocyanine dyes may be represented by the following formula:

II.
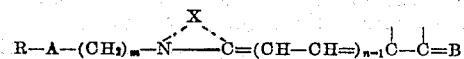

The

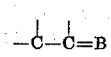

portion of the molecule is part of a ring system or a chain. When

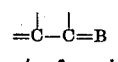

in Formula II is part of a ring system, the new merocyanine dyes may be represented by the following formula:

III.
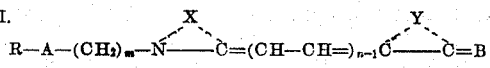

According to one aspect of the invention, the new rhodacyanines may be represented by the following formula:

IV.
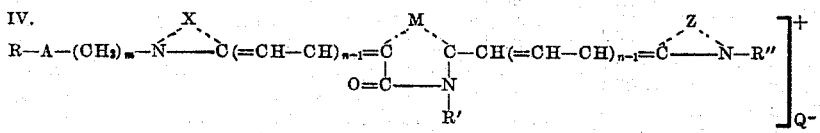 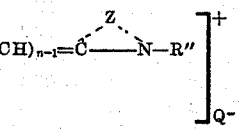

Another type of rhodacyanine may be represented by the following generic formula:

V.
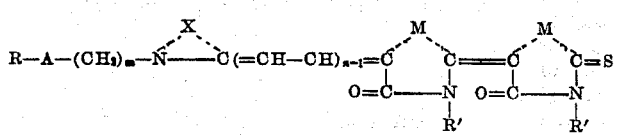

R, in the above formulas, represents an aryl group of the benzene and naphthalene series; R' and R'' an alkyl, aryl or aralkyl group; R'' may, in addition, be R—A—(CH$_2$)$_m$—.
A represents O, S or Se.
B represents O or S.
$m$ represents a small positive integer as, for example, 2 or 3.

$n$ represents a positive integer, such as, from 1 to 5.
X, Y and Z represent the non-metallic atoms necessary to complete a heterocyclic nucleus,
M represents O, S or Se.
Q represents an acid radical, such as, for example, chlorine, bromine, iodine, methosulfate, ethosulfate, p-toluene-sulfonate, perchlorate, etc.

More particularly, in the above formulas:

R may be benzene or naphthalene, or chlorobenzene, or phenyl substituted, for example, by methyl, methoxy, or a branched aliphatic chain as, for example, di-isopropyl, di-isobutyl, tertiary-butyl; or by cyclohexyl or phenyl.

R' and R'' may be, for example, methyl, ethyl, isopropyl, allyl, β-ethoxyethyl, cyclohexyl, phenyl, etc.

R'' may, in addition, be R—A—(CH$_2$)$_m$—, as for example, a phenoxyethyl, phenylthioethyl, phenylselenoethyl, p-di-isobutyl-phenoxyethyl, p-methyl phenoxyethyl, p-cyclohexyl phenoxyethyl, p-chlorophenoxyethyl, p-phenyl phenoxyethyl, or the corresponding phenoxypropyl, phenylthiopropyl or phenylselenopropyl groups.

X and Z represent the non-metallic atoms necessary to complete a five- or six-membered heterocyclic nucleus, usual in cyanine dyes as, for example, a member of the oxazole series, e. g. benzoxazole and naphthoxazole; a member of the thiazole series, e. g. benzthiazole; a member of the thiazoline series, e. g. thiazoline; a member of the pyridine series, e. g. pyridine; a member of the quinoline series, e. g. benzoquinoline, 2-quinoline and 4-quinoline; a member of the selenazole series, e. g. benzselenazole; a member of the selenazoline series; e. g. selenazoline; or a member of the indolenine series, e. g. 3,3-dimethyl indolenine.

Y represents the non-metallic atoms necessary to complete a five-membered heterocyclic nucleus, for example, a 2,4,(3,5)-thiazoledione nucleus, such as 2,4(3,5)-thiazoledione, 3-ethyl-2,4(3,5)-thiazoledione, 3 - phenyl - 2,4(3,5)-thiazoledione or 3-naphthyl-2,4(3,5)-thiazoledione nuclei; a 2-thio-2,4(3,5)-thiazoledione or rhodanine nucleus, such as 3-ethylrhodanine, 3-phenylrhodanine, 3-allylrhodanine, 3-naphthylrhodanine nuclei, or (3-(1-benzothiazyl)-rhodanine) nuclei, a 2-alkylmercapto-4(5)-thiazolone nucleus, such as 2-ethylmercapto-4(5)-thiazolone, a thiazolidone nucleus, such as 4-thiazolidone or its 3-alkyl, 3-phenyl or 3-naphthyl derivatives, a 2-alkyl-phenylamino-4(5)-thiazolone nucleus, or a 2-diphenylamino-4(5)-thiazolone nucleus; an oxazolone nucleus, for example, a 2-thio-2,4(3,5)-oxazoledione nucleus, such as 3-ethyl-2-thio-2,4(3,5)-oxazoledione nucleus; an imidazolone nucleus, for example, a 2,4(3,5)-imidazoledione nucleus, such as 2,4(3,5)-imidazoledione (hydantoin) or its 3-ethyl, 3-phenyl or 3-naphthyl derivatives, a 2-thio-2,4(3,5)-imidazoledione nucleus, such as 2-thiohydantoin or its 3-ethyl, 3-phenyl or 3-naphthyl derivatives, a 4-thio-2,4(3,5)-imidazoledione nucleus such as 4-thiohydantoin or its 3-ethyl, 3-phenyl or 3-naphthyl derivatives, a 2-alkylmercapto-5(4)-imidazolone, such as 2-propylmercapto-5(4)-imidazolone, a thionaphthenone nucleus, such as 2(1)-thionaphthenone or 1(2)-thionaphthenone, a pyrazolone nucleus, for example, 1-phenyl-3-methyl-5-pyrazolone; an oxindole nucleus, such as 2,3-dihydro-3-ketoindole, and similar five-membered heterocyclic nuclei. Y can also represent the nonmetallic atoms necesary to complete a six-membered heterocyclic nucleus, such as a 2,4,6-triketohexahydropyrimidine nucleus, for example, barbituric acid or 2-thiobarbituric acid and their 1-alkyl or 1,3-dialkyl derivatives.

The above five- and six-membered nuclei set forth under Y are all derived from heterocyclic compounds containing a nuclear ketomethylene group, that is, such heterocyclic compounds as are characterized by a nuclear

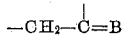

grouping wherein B stands for O or S.

My new dyes may be employed to produce optically sensitized gelatino-silver halide emulsions, such as, for example, gelatino-silver chloride emulsions. In this connection, they possess many advantages and novel properties. For instance, it is often necessary to increase the molecular "bulk" of a dye for purposes of nondiffusion. However, such increase in molecular size of the cyanine dye by means of increasing the molecular size of the alkyl or aralkyl groups in the cyanine nitrogen atoms of heretofore known cyanine dyes diminishes the overall power of sensitization. Thus, substituting the cyanine nitrogen aralkyl group in the aryl portion by a di-isopropyl or tertiary-butyl or phenyl group of a cyanine dye decreases the sensitization power of the dye. A similar depression in power of sensitization occurs when a long chain alkyl group is introduced directly to the cyanine nitrogen.

On the other hand, the merocyanine and rhodacyanine dyes of the present invention do not lose their power of sensitization nor are they materially affected in speed when increasing the "bulk" of the dye by such substitutions in the aryl portion of the molecule. Thus, alkyl, branched alkyl groups, phenyl, cyclohexyl and halogen, such as bromine and chlorine groups may be substituted in the aryl portion of the dye molecule without materially affecting the speed or power of sensitization of the dye.

The dyes of the present invention possess another advantage in that they do not wander or diffuse when they are utilized in multilayer photographic coatings such as are employed in color photography. Nor are they displaced from the layer by the color former that may be present. Such unique properties of my new dyes render them highly valuable in the photographic arts.

My new merocyanine dyes can be prepared by condensing in the presence of a base, a cyclammonium quaternary salt which can be represented by the following generic formula:

VI.
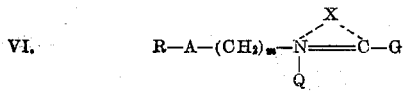

with a ketomethylene compound having the following grouping:

VII.

which ketomethylene grouping forms part of a ring system or a chain.

In the above formulas, R, A, $m$, Q and X have the same significance as hereinabove described. G stands for a reactive group, such as a halogen, cyano, alkyl- or arylmercapto, alkoxy, anilino or acetanilido groups in one of the reactive positions, i. e., the alpha- or gamma- position.

In an alternative procedure, my new merocyanine dyes can be prepared by condensing in the presence of a base a compound of Formula VI where G stands for —CH₃ with a compound having the following formula:

VIII.
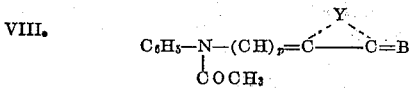

where B and Y have the significance described hereinbefore, and $p$ is a positive odd integer such as 1, 3, and 5.

As suitable cyclammonium quaternary salts, I employ any of those which correspond to the heterocyclic nuclei described under X of the above formulas. As suitable nuclear ketomethylene compounds, I employ any of those which correspond to the heterocyclic nuclei described under Y of the above formulas. As suitable compounds where the ketomethylene group is in a chain, there is mentioned, for example, acetylacetone, ethyl malonate, ethyl acetoacetate, benzoyl acetonitrile, benzoylacetone, etc.

My new rhodacyanine dyes can be prepared in general by quaternizing any of my new merocyanine dyes containing the following grouping:

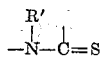

with an alkyl salt, and then condensing the resulting dye intermediate in the presence of a base with a cyclammonium quaternary salt containing a reactive methyl group, or with a nuclear or chain ketomethylene compound.

The intermediates of Formula VI are described in my co-pending application Serial No. 638,493, filed December 29, 1945, now Patent No. 2,481,464, of September 6, 1949, and in general can be prepared by reacting a heterocyclic nitrogen base usual in cyanine dyes with a p-toluenesulfonate of the following formula:

IX.   

wherein A, R and m have the significance hereinbefore described.

Such p-toluenesulfonates can, in general, be prepared by reacting p-toluenesulfonyl chloride in the presence of a base, such as caustic alkali or pyridine with an alcohol of the following general formula:

X.   $R-A-(CH_2)_mOH$ wherein R, A, and m have the significance described hereinabove.

The following examples will serve to illustrate the manner of carrying out my invention:

Example 1

There were refluxed 4.73 grams of 2-methylmercaptobenzthiazole phenoxyethyl p-toluenesulfonate and 1.61 grams of 3-ethylrhodanine and 0.35 gram of triethylamine dissolved in 30 cc. of absolute ethyl alcohol. A dye having the following formula crystallized from the reaction mixture. The dye was purified by dissolving in dioxane and precipitating with 95% alcohol.

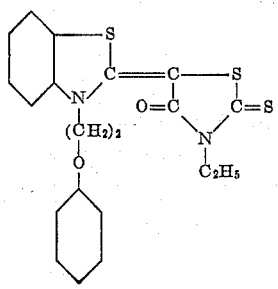

Example 2

Two grams each of 2-methylbenzothiazole phenoxyethyl p-toluenesulfonate and 3-allyl-5-acetanilidomethylene rhodanine were dissolved in 50.0 cc. of hot isopropyl alcohol and 0.5 cc. of triethylamine were added. The mixture was refluxed for 30 minutes and the crystals of dye which formed on cooling the reaction mixture were filtered. The dye was purified by dissolving in dioxane and precipitating with 95% ethyl alcohol. It had a melting point of 234° C. The formula for the dye may be represented as follows:

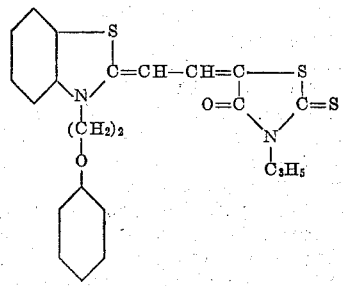

By utilizing 2-methylbenzoxazole phenoxyethyl p-toluenesulfonate, a dye identical in formula with that of Example 2, except that the sulfur in the benzthiazole is replaced by an oxygen atom, is obtained.

Example 3

Equimolecular proportions of 5-(γ-acetanilido-allylidene)-3-ethylrhodanine and 2-methyl-6-methoxy benzselenazole phenoxyethyl p-toluenesulfonate were condensed as in Example 2. A dye having the following formula was obtained.

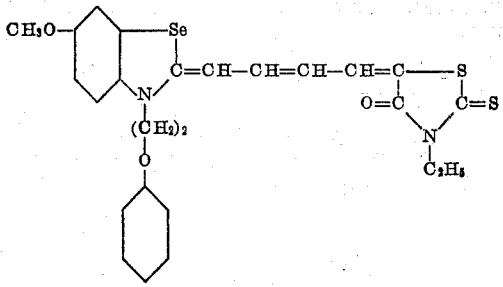

Example 4

The procedure in Example 2 was followed except that the 3-allyl-5-acetanilidomethylene rhodanine was replaced by an equivalent amount of 5-acetanilidomethylene-3-ethyl-2-thio-2,4(3,5)-oxazolidone. A dye having the following formula is obtained:

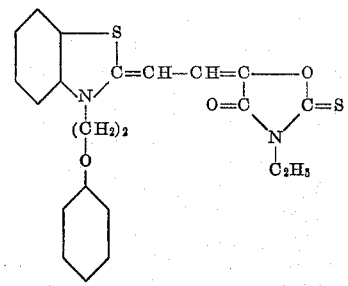

Example 5

When 5-(γ-acetanilido-allylidine)-3-ethyl-1-phenyl-2-thio-hydantoin is employed as the ketomethylene compound following the procedure of Example 2, the dye of the following formula is obtained:

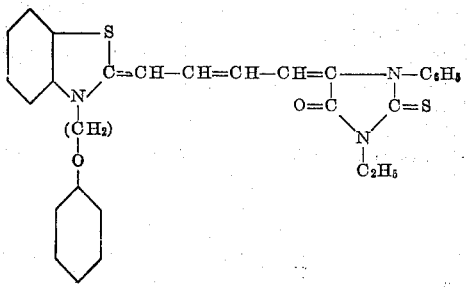

Example 6

When 4-(γ-acetanilido-allylidine)-3-methyl-1-phenyl-5-pyrazolone is employed as the ketomethylene compound following the procedure of Example 2, a dye having the following formula is obtained:

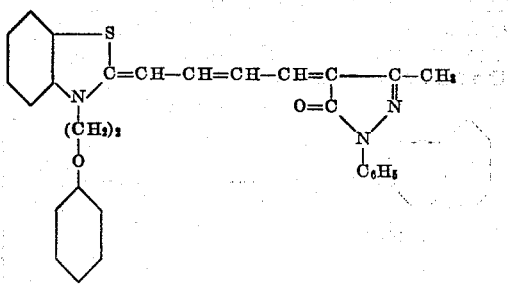

Example 7

Equimolecular proportions of 2-methylbenzthiazole phenoxyethyl p-toluenesulfonate and α-(γ-acetanilido-allylidine)-benzoylacetonitrile, 30 cc.

of ethyl alcohol and 0.5 cc. of triethylamine were refluxed for about 30 minutes. On cooling there crystallized out a dye having the following formula:

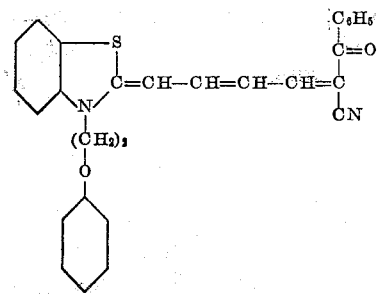

In a manner similar to that illustrated, other ketomethylene containing compounds hereinabove described can be employed in preparing my new merocyanine dyes. Instead of the phenyloxyethyl derivatives of the cyclammonium quaternary salts as illustrated by the above examples, there may be employed the corresponding phenylthioethyl, phenylselenoethyl, phenoxypropyl, phenylthiopropyl and phenylselenopropyl derivatives as set forth under Formula VI. As specific examples of such other cyclammonium quaternary salts, there may be mentioned: 2-methyl-5,6-methylenedioxy benzthiazole phenylthioethyl- (or phenoxyethyl, phenylselenoethyl, phenylthiopropyl, phenyloxypropyl, phenylselenopropyl)-p-toluenesulfonates, 2-methyl-5,6-methylenedioxybenzthiazole p-chlorophenoxyethyl p-toluenesulfonate, 2-methyl-5,6-methylenedioxybenzthiazole (p-t-butyl) phenoxyethyl p-toluenesulfonate, 2-methyl-5,6-methylenedioxybenzthiazole (p-di-isobutyl) phenoxyethyl p-toluenesulfonate, 2-methyl - 5,6 - methylenedioxybenzthiazole (p-methyl) phenoxyethyl p - toluenesulfonate, 2-methyl-5,6-methylenedioxybenzthiazole β-naphthoxyethyl p-toluenesulfonate, and 2-methyl-6,7-benzobenzthiazole phenoxypropyl p-toluenesulfonate.

The following examples will serve to illustrate the preparation of my new rhodacyanine dyes:

*Example 8*

Five-tenths gram of the dye prepared in Example 2 was mixed with 10 cc. of methyl sulfate and heated at 110° C. for 10 minutes. The mixture was chilled in ice-water and a large excess of pyridine added, followed by 0.3 gram of 2-methylbenzothiazole ethiodide. The new mixture was refluxed 30 minutes and cooled. On adding 10 cc. of water and allowing to stand, a dye precipitated. The dye crystals which separated were filtered off and boiled out with a dioxanemethanol mixture. The dye was recrystallized from methanol. It had the following formula:

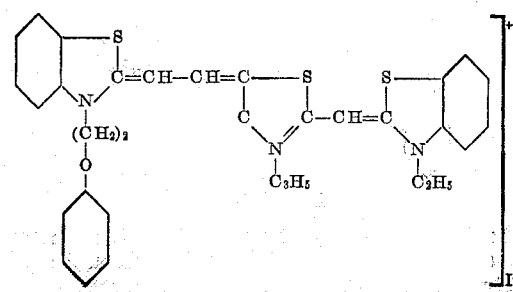

*Example 9*

Instead of employing 2-methylbenzthiazole ethiodide in Example 8, there is employed an equivalent amount of 2-methylbenzoxazole phenoxypropyl p-toluenesulfonate. A dye having the following formula is obtained.

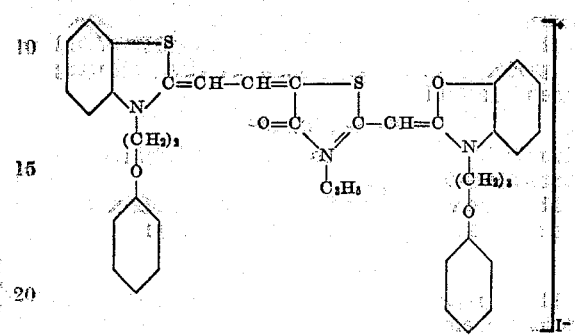

*Example 10*

Instead of employing 2-methylbenzthiazole ethiodide in Example 8, there is employed 3-phenylrhodanine. A dye having the following formula is obtained:

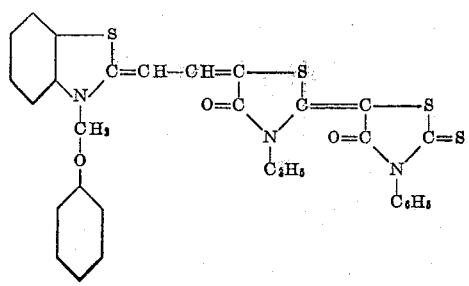

In a similar manner to that illustrated other rhodamerocyanine dyes containing the

group on the heterocyclic nitrogen atom may be quaternized and condensed with a ketomethylene compound or a cyclammonium quaternary salt to form other complex rhodacyanine dyes.

The condensation reactions to form my new merocyanine and rhodacyanine dyes may be advantageously carried out in the presence of a basic condensing agent, organic bases being preferable. As examples of such bases there may be mentioned in addition to triethylamine and pyridine, tributylamine, N-methylpiperidine, triethanolamine, etc. Other basic condensing agents which may be employed are, for example, sodium carbonate, sodium hydroxide, sodium ethylate, potassium hydroxide, or potassium carbonate. Diluents may also be employed and for this purpose lower aliphatic alcohols such as ethyl, isopropyl, n-propyl and isobutyl and n-butyl alcohols are suitable.

The ketomethylene compounds and the cyclammonium quaternary salts are ordinarily employed in equimolecular proportions, but an excess of either may be employed if desired. The basic condensing agent is preferably utilized in small excess, and in at least that amount which will bind the acid eliminated by the condensation reaction.

The following examples will serve to illustrate the production of intermediates of Formula VI.

*Example 12*

Molecular proportions of 2-methylbenzothiazole and phenoxyethyl p-toluenesulfonate were heated together in an oil bath at 130–140° C. for 16 hours. A mixture of dry acetone and dry ethyl ether was added to the cooled reaction mixture. There was obtained 2-methylbenzthiazole phenoxyethyl p-toluenesulfonate.

*Example 13*

If, instead of the 2-methylbenzthiazole, there is substituted in Example 12, 2-methylmercaptobenzthiazole, there is obtained 2-methylmercaptobenzthiazole phenoxyethyl p-toluenesulfonate.

In a similar manner, other aryloxyalkyl, arylthioalkyl, and arylselenoalkyl cyclammonium quaternary salts can be obtained.

The following examples will serve to illustrate the process of producing the intermediates of Formula IX:

*Example 14*

19.4 grams (0.1 mol) of β-(p-tertiary butyl phenoxy) ethyl alcohol were dissolved in 32 grams of pyridine and 19.2 grams (0.11 mol) of p-toluene sulfonyl chloride were added while stirring. The temperature was kept below 5° C. while adding the latter reagent and the stirring was continued for an additional 3 hours at a temperature under 20° C. After standing for 12 hours, the reaction solution is poured into 60 cc. of concentrated hydrochloric acid diluted with 140 cc. of water. The white solid was filtered off, washed with 2 N caustic alkali solution and finally with cold water. After drying, the solid was recrystallized from petroleum ether B. P. 90°–100° C. The product, p-(t-butyl) phenoxyethyl p-toluenesulfonate, had a melting point of 92° C.

In a similar manner, p-di-isobutyl phenoxyethyl p-toluenesulfonate was prepared and had a melting point of 86° C. Similarly, there were prepared p-methyl phenoxyethyl p-toluenesulfonate, which melted at 55° C., p-cyclohexyl phenoxyethyl p-toluenesulfonate which melted at 113° C., p-chlorophenoxyethyl p-toluenesulfonate which melted at 70° C., and p-phenyl phenoxyethyl p-toluenesulfonate which melted at 152° C.

The arylthioalkyl and arylselenoalkyl p-toluenesulfonates can be prepared by reacting thio- or selenophenols or substituted thiophenols or selenophenols with a halohydrin, as for example, ethylene chlorohydrin, or trimethylene chlorohydrin in the presence of sodium alcoholate and then reacting the arylthioalkyl alcohol or arylselenoalkyl alcohol with p-toluene sulfonyl chloride in a manner similar to that illustrated in Example 14.

*Example 15*

15.4 grams of β-phenylthioethyl alcohol and 21 grams of p-toluene sulfonyl chloride were reacted by employing the same procedure as in Example 14. There was isolated phenylthioethyl p-toluenesulfonate.

*Example 16*

40.2 grams of β-phenylselenoethyl alcohol and 38.4 grams of p-toluene sulfonyl chloride were reacted by employing the procedure of Example 14. There was isolated phenylselenoethyl p-toluenesulfonate.

In a similar manner, other aryloxyalkyl, arylthioalkyl, and arylselenoalkyl p-toluenesulfonates can be prepared.

From the above examples, it is apparent that a large number and variety of merocyanines and rhodacyanine dyes having the heterocyclic nucleus of Formula I can be produced. The above examples are accordingly not intended to be limiting, but only illustrative of the type of compounds that can be prepared. Various modifications will readily occur to those skilled in the art.

The diagrammatic spectrograms constituting the accompanying drawing illustrate the regions of the spectrum to which the merocyanine and rhodacyanine dyes will sensitize a gelatino silver-halide emulsion containing about 4–5% of silver-halide and the extent of the sensitization at various wavelengths. The two figures of this drawing illustrate the sensitizing properties of the merocyanine dyestuff of Example 2 and the rhodacyanine dyestuff of Example 8.

In the preparation of photographic emulsions sensitized with my new merocyanine and rhodacyanine dyes, the dyes may be dissolved in methyl or ethyl alcohol and a volume of this solution containing from 5 to 50 milligrams of the dye added to a kilogram of emulsion. The emulsion is any of the usually employed silver halide emulsions as, for example, the silver chloride and silver bromide type with gelatin as the carrier. The solution of the dye is added to the emulsion while stirring until the dye is thoroughly incorporated therein. While this is the preferred method of incorporating the dye in the emulsion, other methods may be employed, such as bathing the emulsion coated on a support, as a film or plate, with a solution of the dye in an appropriate solvent.

The term "merocyanine" as used herein and in the claims is intended to include not only merocyanine dyes but also rhodacyanine and rhodacarbocyanine dyes.

I claim:

1. A photographic gelatino silver-halide emulsion containing a dye selected from the group consisting of dyes of the general formulae:

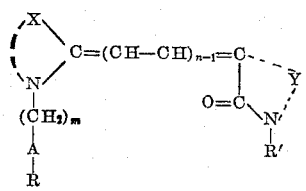

and

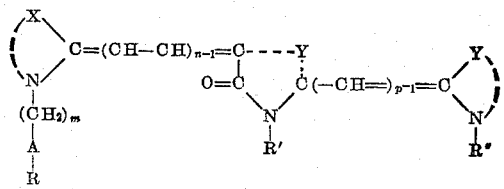

wherein A is selected from the group consisting of O, S and Se, m is selected from the numerals consisting of 2 and 3, n is a numeral ranging from 1 to 3, p is a numeral ranging from 1 to 2, R is a member of the benzene series, R' is selected from the group consisting of alkyl, aryl and aralkyl groups; R'' is selected from the group consisting of alkyl, aralkyl and R—A (CH₂)ₙ groups, and X and Y represent the atoms necessary to complete a 5-membered heterocyclic nitrogenous nucleus of the type common in cyanine dyes.

2. A photographic gelatino-silver-halide emulsion which contains a merocyanine dye of the following formula:

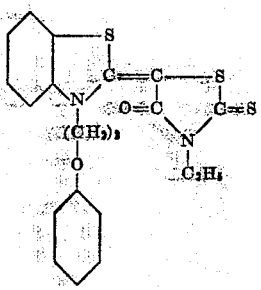

3. A photographic gelatino-silver-halide emulsion which contains a merocyanine dye of the following formula:

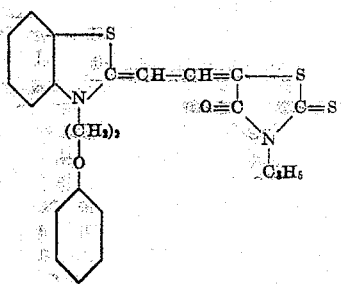

4. A photographic gelatino-silver-halide emulsion which contains a rhodacyanine dye of the following formula:

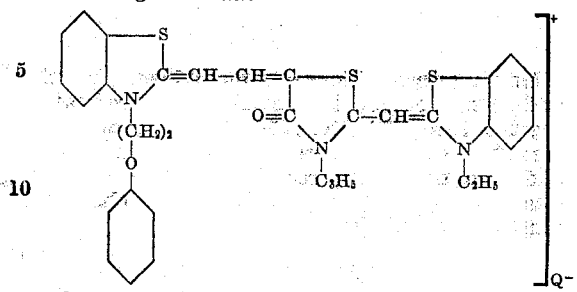

wherein Q stands for an acid radical.

ALFRED W. ANISH.

REFERENCES CITED

The following references are of record in the file of this patent:

UNITED STATES PATENTS

| Number | Name | Date |
|---|---|---|
| 2,075,153 | Wilmanns | Mar. 30, 1937 |
| 2,177,401 | Brooker | Oct. 24, 1939 |
| 2,213,238 | Brooker et al. | Sept. 3, 1940 |
| 2,213,995 | Riester et al. | Sept. 10, 1940 |
| 2,231,658 | Brooker et al. | Feb. 11, 1941 |
| 2,233,511 | Brooker et al. | Mar. 4, 1941 |
| 2,235,027 | Kumetat et al. | Mar. 18, 1941 |
| 2,238,231 | Riester et al. | Apr. 15, 1941 |
| 2,256,163 | Kumetat et al. | Sept. 16, 1941 |
| 2,289,300 | Wilmanns et al. | July 7, 1942 |
| 2,354,524 | Kumetat et al. | July 25, 1944 |
| 2,388,963 | Fry et al. | Nov. 13, 1945 |
| 2,398,999 | Brooker et al. | Apr. 23, 1946 |

OTHER REFERENCES

Chemical Abstracts, 19: 530; abstract of Proc. Roy. Soc. (London), 96B, 317–333 (1924).

Chemical Abstracts 16: 3101; abstract of Brit. Med. Journ., 1922, I, 514–515. (Copies in S. L.)